United States Patent [19]
Murphy

[11] Patent Number: 5,352,356
[45] Date of Patent: Oct. 4, 1994

[54] STOVEPIPE DECANTER APPARATUS

[76] Inventor: D. Thomas Murphy, 584 Mililani Dr., Kihei, Hi. 96753

[21] Appl. No.: 32,112

[22] Filed: Mar. 17, 1993

Related U.S. Application Data

[60] Continuation-in-part of Ser. No. 850,113, Feb. 19, 1992, Pat. No. 5,234,580, which is a division of Ser. No. 753,860, Sep. 3, 1991, Pat. No. 5,186,821.

[51] Int. Cl.⁵ .............................................. B01D 21/24
[52] U.S. Cl. .................... 210/122; 137/398; 210/136; 210/242.1; 210/435
[58] Field of Search ............... 210/121, 122, 232, 234, 210/242.1, 242.2, 242.3, 532.1, 776, 259, 459, 460, 136, 435; 137/578, 398; 122/389

[56] References Cited
U.S. PATENT DOCUMENTS

| | | | |
|---|---|---|---|
| 1,109,550 | 9/1914 | Schreiber | 137/578 |
| 2,008,630 | 7/1935 | Stutsman | 122/389 |
| 2,140,059 | 12/1938 | Simonsen | 137/398 |
| 4,439,323 | 3/1984 | Ball | 210/608 |
| 4,468,327 | 8/1984 | Brown | 210/626 |
| 4,596,658 | 6/1986 | Mandt | 210/626 |
| 4,601,833 | 7/1986 | Shubert | 210/242.1 |
| 4,695,376 | 9/1987 | Astrom et al. | 210/242.1 |
| 4,711,716 | 12/1987 | Calltharp | 210/136 |
| 4,883,602 | 9/1989 | Anderson | 210/776 |
| 4,891,128 | 1/1990 | Goronszy | 210/121 |
| 4,966,705 | 10/1990 | Jamieson | 210/605 |
| 5,104,528 | 4/1992 | Christie | 210/242.1 |
| 5,106,494 | 4/1992 | Norcross | 210/242.3 |
| 5,141,632 | 8/1992 | Catcher | 210/242.3 |

Primary Examiner—Joseph W. Drodge

[57] ABSTRACT

A modular decanting apparatus that is self supporting that may be used in single or multiple configurations to accommodate the removal of wastewater effluent from a wide range of geometric configurations of basins and sizes while substantially reducing the overflow velocities created during a decanting process. It's "Stove Pipe" configuration provides the option of effluent discharge from its top, bottom or mid section and allows effluent to be discharged by internal pump pressure, external pump suction or by gravity flow according to engineering choice. The apparatus includes a weighted support base, and the stove pipe is captured and surrounded by a buoyant doughnut shaped manifold containing fluid inlet valves and a flexible hose with a straight section connecting the manifold to the interior of the stove pipe assembly and also includes a larger flexible hose connecting the stove pipe assembly to the discharge system of a wastewater treatment reactor. Also, the manifold may be made buoyant by an inflatable and deflatable bladder which is controlled by an air hose connecting the bladder to a control circuit of the reactor. The purpose of the inflatable, deflatable bladder is to allow the decanting apparatus to sink beneath the fluid level of the basin during its air/on and settling phases. In a second embodiment two uprising vertical members having their own supports are disclosed which, when spaced apart, capture a buoyant rectangular manifold with multiple fluid inlet valves and a flexible effluent discharge hose.

11 Claims, 5 Drawing Sheets

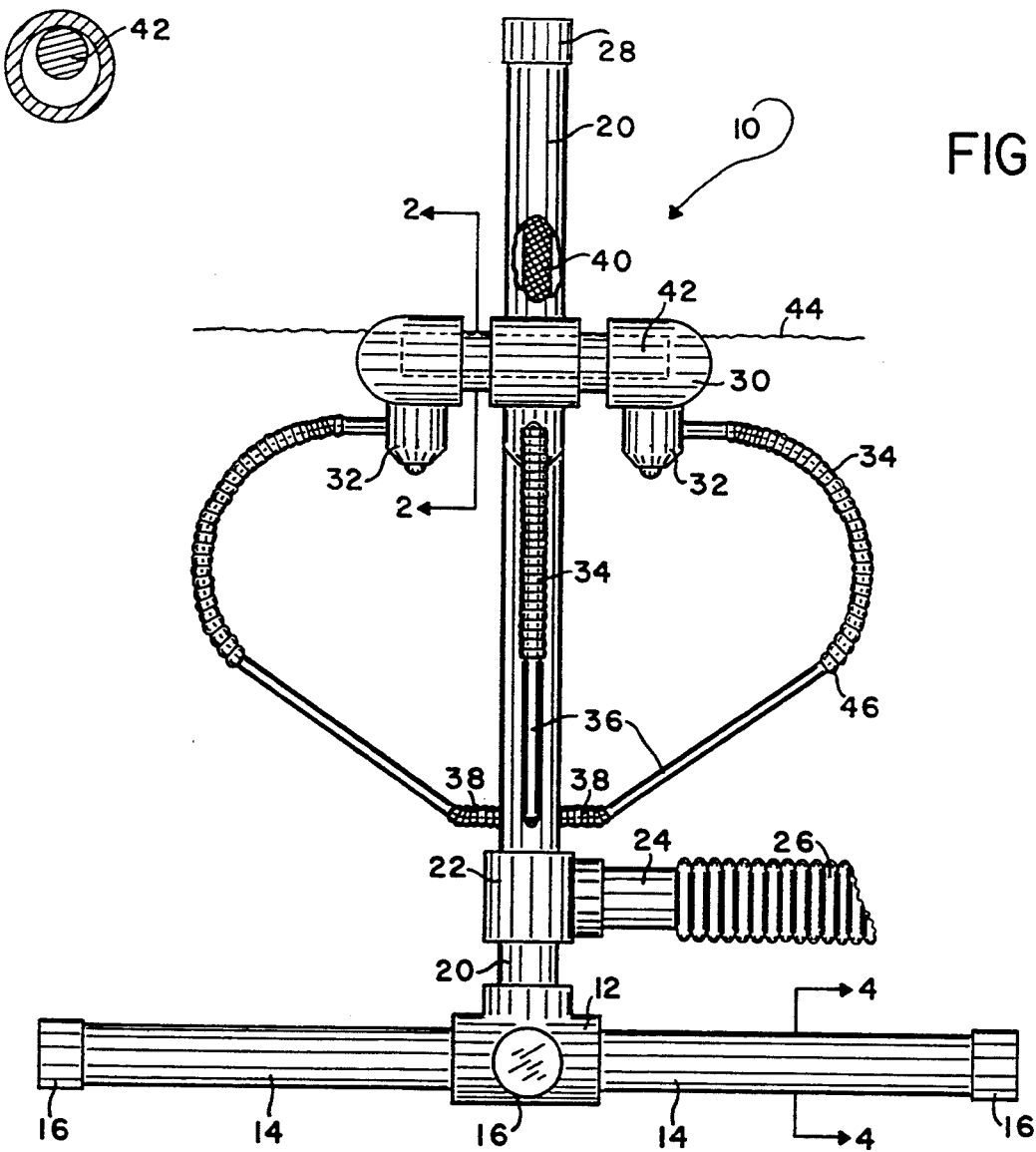

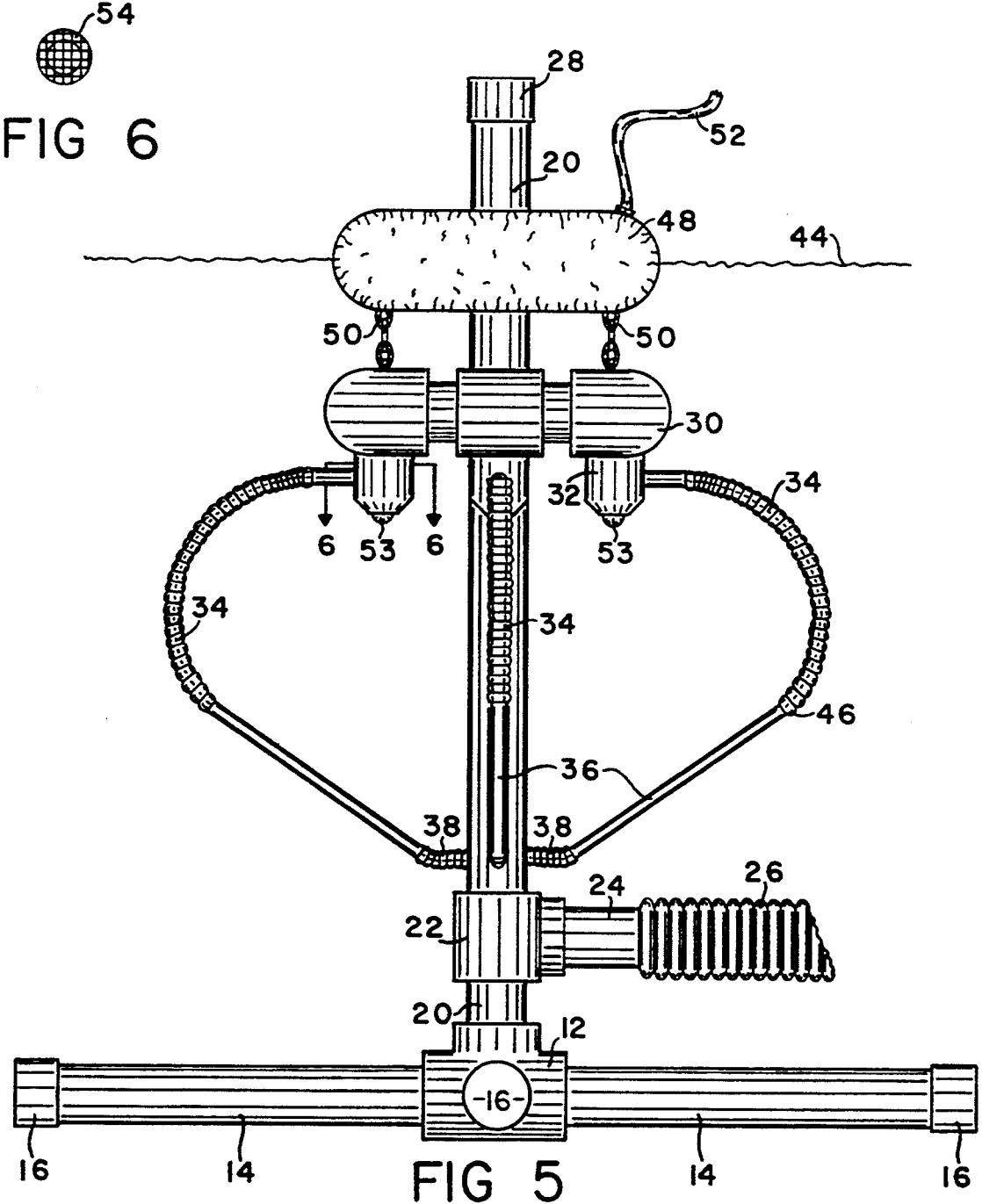

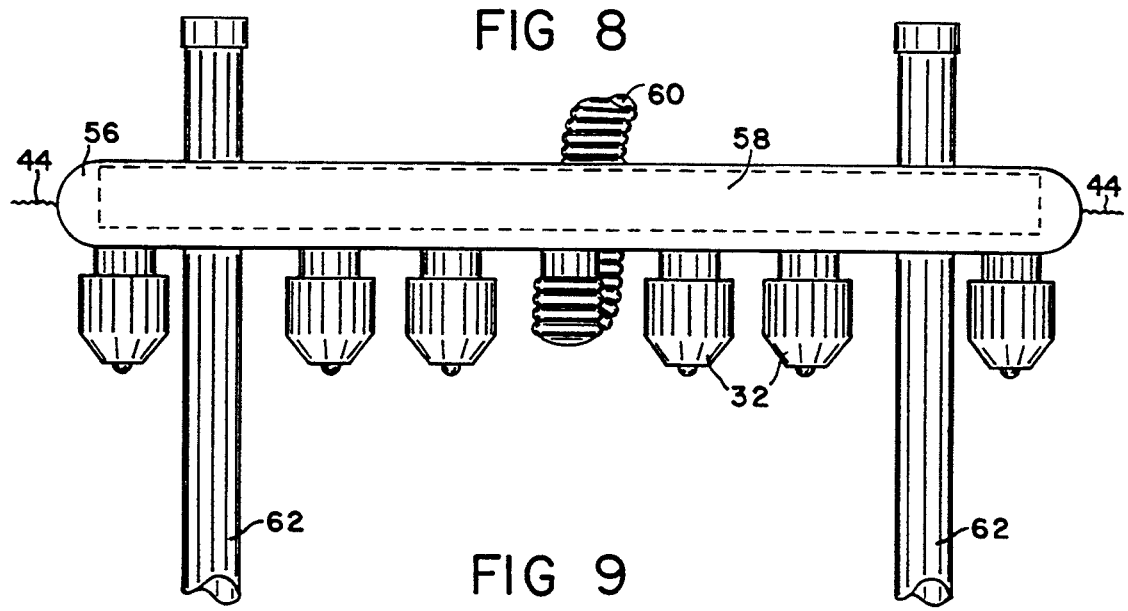
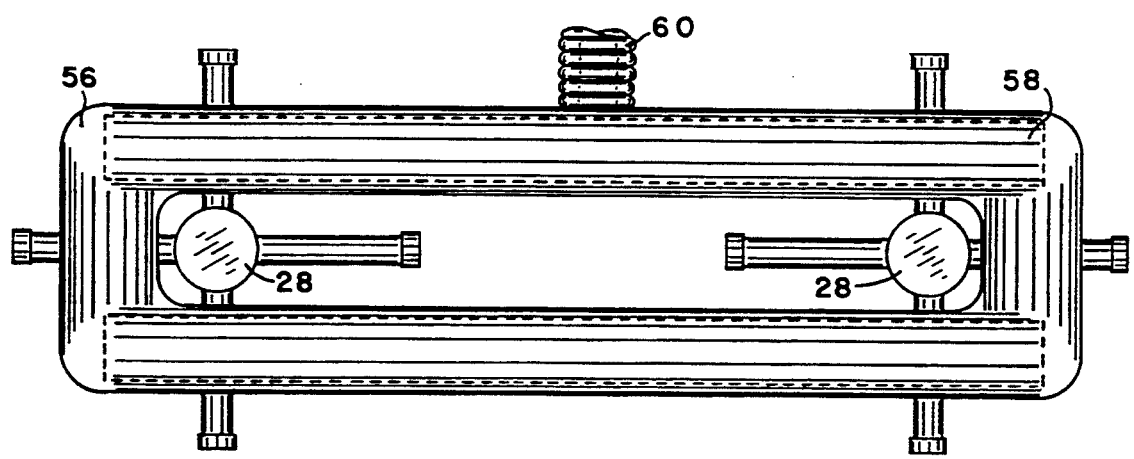

STOVEPIPE DECANTER APPARATUS

CROSS REFERENCE TO RELATED APPLICATION

The present invention is a continuation in part of Ser. No. 07/850,113 filed Feb. 19, 1992 now issued as U.S. Pat. No. 5,234,580 which in turn is a divisional of Ser. No. 07/753,860 filed Sep. 3, 1991, now by the same inventor.

FIELD OF THE INVENTION

This invention relates to wastewater treatment systems and more particularly to the decanting apparatus's associated with large municipal systems such as earthen basins.

BACKGROUND OF THE INVENTION

Certain wastewater treatment processes, especially those utilizing sequential batch reactor's for fill and draw techniques or processes, require that clarified fluid be periodically withdrawn from the reactor or digester within which the process is occurring. Such decanters must be functional throughout the year, even in environments where the lower temperature extremes may form ice upon the upper layer of the fluid within the reactor. It is also important that the decanting system not entrain sludge during mix cycles within the reactor or have sludge settle within the decanting system such that when clarified liquid is withdrawn, a certain amount of sludge is withdrawn with the liquid, as such entrainment would discharge highly polluted effluent.

One of the major problems with previous decanter systems for use in batch reactors has been that a receiver for the decanter has had the interior thereof open to the fluid within the reactor during sludge mixing cycles. When the sludge is being mixed with the incoming effluent and the entire reactor is in a generally mixed state, sludge is near the top of the reactor as well as the bottom. If the receiver is open at this time, the sludge usually enters the receiver and settles therein during settling cycles.

Thereafter, when the clarified fluid is withdrawn through the receiver, the sludge that is within the receiver is entrained with the clarified fluid to pollute the effluent. One solution to this problem is to withdraw the clarified fluid with a pump and have a cycle at the beginning of the withdrawal of the clarified fluid in which a certain amount of this fluid is directed back to the reactor so as to return the entrained sludge. Such a solution requires a pump and control mechanism or the like and close control of the recycle of the clarified fluid to the reactor.

Other attempts to resolve the problem of the sludge settling within the receiver, have been directed to physically removing the receiver from the tank during mixing cycles. This typically requires a cumbersome and expensive structure which is suitably strong to hold a decanting system out of the reactor fluid during the mix cycle. In addition, where freezing is likely to occur, fluid within the decanting structure may freeze if raised from the liquid in the reactor or, the fluid level at the top of the reactor may freeze which may make it difficult or impossible to raise and lower the decanting structure and to raise or lower a decanter requires a mechanical mechanism that is affected by weather conditions and requires regular maintenance.

Other problems associated with the decanting structure are that the receiver should be sufficiently spaced from the sludge layer to prevent accidental intake of sludge into the receiver. In addition, the receiver should withdraw clarified fluid in such a manner that the withdrawn fluid does not entrain sludge due to high velocities of the withdrawn fluid coming from or near the sludge layer or because the withdrawn fluid is taken from directly above the sludge layer.

Also the support structure for the decanter system must allow for vertical movement of the receiver, as the upper liquid level in the reactor may vary substantially during the different cycles therein. Preferably, the support structure allows the receiver to be supported at a generally fixed height beneath the upper liquid level so as to prevent entrainment of floating debris or scum into the receiver and articulated sufficiently so that the receiver may move freely and smoothly vertically while the upper liquid level is varying.

Certain other devices are designed to draw clarified fluid from near the bottom of the reactor so that a siphon can control flow. This draws from precisely the region of heavy sludge which should be avoided and should draw from the most clarified supernatant zone which is just below the liquid surface.

It is also noted that certain prior art decanting systems have incorporated extensive and expensive mechanical devices for manipulating the fluid receiver, sometimes into and out of the liquid layer within the reactor. The complex mechanical devices required for this operation are subject to failure and do not provide a simple and easy method of preventing sludge entry into the receiver. These devices often do not function well, if at all, where ice is floating on or forming upon the upper layer of the reactor and they require very level weirs so as to receive the liquid effluent evenly. These types of decanters in practice have proven to have problems maintaining a level weir, especially in the larger sizes.

The present invention is an improvement on the decanting apparatus of application Ser. No. 07/850,113, filed Feb. 19, 1992 by the same inventor and concerns a decanting apparatus being supported by a unique structure which is more adaptable to a large municipal installation such as an earthen basin or large open concrete basin and which may be ganged or installed in multiples or series to further reduce over flow velocities created during the decanting phase.

It is therefore, a primary object to provide a decanting apparatus for use in conjunction with a wastewater treatment facility which is highly effective in preventing sludge and/or mixed liquor from entering into the receiver during aeration or mixing cycles.

Still another object is to provide a decanting apparatus which is adaptable for use in different climates, wherein ice may form on top of the liquid level in the reactor.

Yet another object is to provide a decanting apparatus which prevents floating surface scum and debris from being withdrawn with the clarified effluent from the reactor.

Still another object is to provide a decanter module unit that can be easily installed and stand on its own.

Another important object is to provide a decanting apparatus which is articulated with respect to the reactor and freely moves vertically to compensate for change in the liquid level within the reactor.

Still another important object is to provide in the preferred embodiment means to keep the decanting apparatus at a specified location horizontally within the vessel to take advantage of the most optimum place to remove clarified effluent.

Yet another object is to provide a decanter that will load uniformly and is self leveling with the water level so as to prevent high flow velocities from occurring at one section as opposed to another section of a large version decanter.

Still another object is to provide a decanter which will draw uniformly 360 degrees in an even flow pattern to each of the receivers.

Another important object is to provide a check valve receiver mechanism that is not of a material proven to require periodic replacement.

Still another object is to provide a flexible discharge line or lines between the floating decanter and the stovepipe support structure.

Yet another object is to provide at least one straight pipe section in each flexible discharge line to keep the discharge line from becoming entangled Another important object is to make the stovepipe structure in a manner which makes it adaptable to discharge from its top, bottom or any installed T-section of engineering choice.

Still another important object is to provide as an option, a screen inside of the stovepipe structure through which the discharge effluent must pass through.

Another object is to make the stovepipe structure adaptable to cooperate with a pump or gravity discharge of engineering choice.

Another very important object is to provide a "stovepipe" structure to support the floating decanter and which allows the "stovepipe" to be also used as a discharge pipe.

Other objects and advantages will become apparent when taken into consideration with the following drawings and specifications.

BRIEF DESCRIPTION OF THE DRAWINGS

FIG. 1, is a side view in elevation of the preferred embodiment.

FIG. 2, is a section taken at 2—2 of FIG. 1, drawn to a larger scale.

FIG. 3, is a side view in elevation of a screen used with the preferred embodiment.

FIG. 4, is a section taken at 4—4 of FIG. 1.

FIG. 5, is a side view in elevation of a second embodiment including a separate float bladder shown in an inflated first position.

FIG. 6, is a section taken at 6—6 of FIG. 5.

FIG. 8, is a side view in elevation of yet another embodiment.

FIG. 9, is a top view of the embodiment of FIG. 8.

DETAILED DESCRIPTION OF THE DRAWINGS

Figure 7:
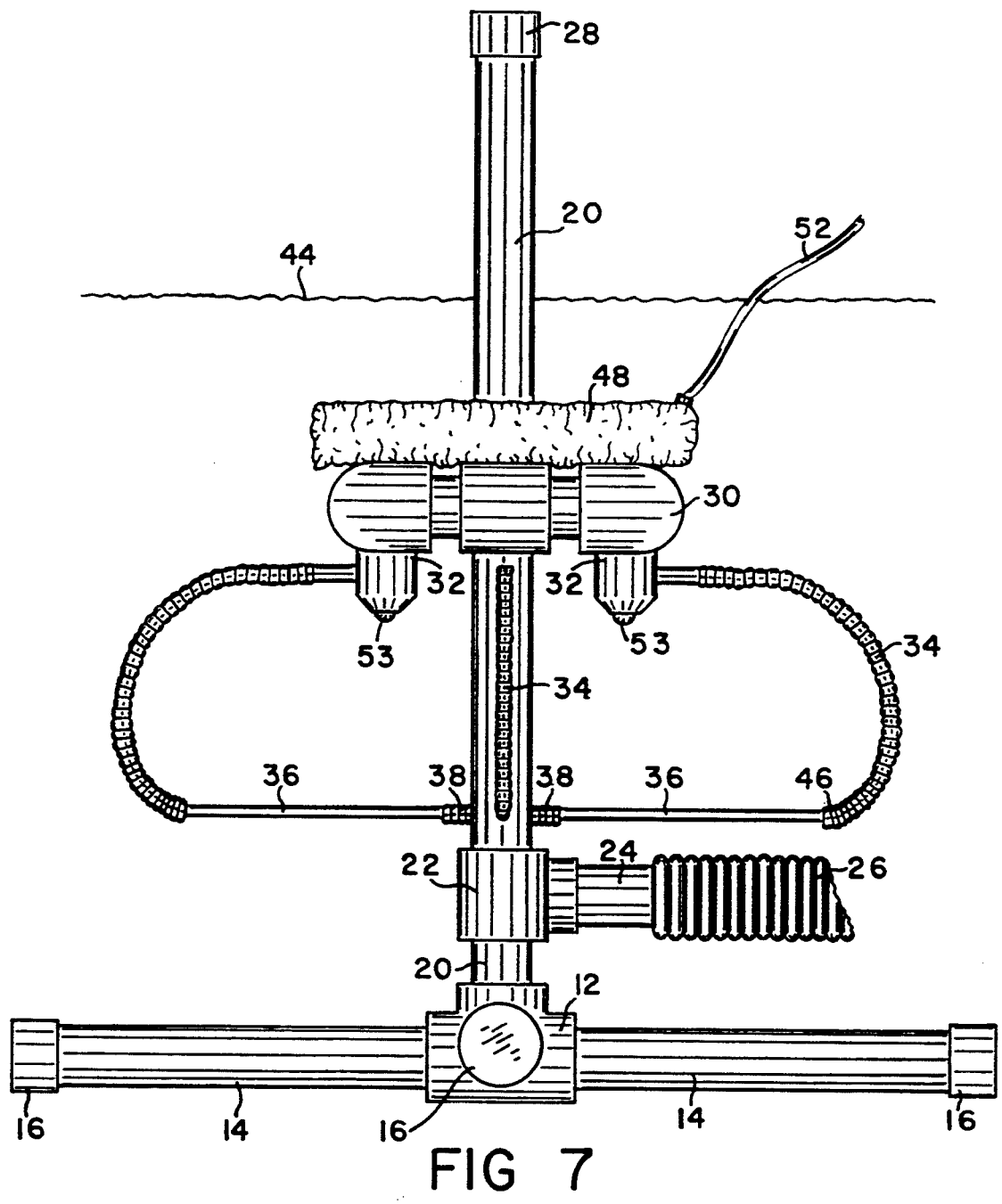
FIG. 7, is a side view in elevation of the embodiment shown in FIG. 5 in a deflated second position.

Referring now in detail to the drawings wherein like characters refer to like elements throughout the various drawings, in FIG. 1, 10 is an overview of a floating decanter of the present invention with 12 being a 5-way-tee supporting multiple legs 14 with end caps 16, tee 12 and legs 14 may be suitably weighted such as by concrete 18 shown in FIG. 4 which may include rebar (not shown).

Tee 12 also supports upright pipe stem 20, which may include a tee 22, tee 22 receiving pipe section 24 with 26 being a stem effluent discharge pipe which may be a flexible pipe suitably attached (not shown) to pipe section 24.

The flexible effluent discharge pipe 26 may be of sufficient length to drape over the edge of a basin such as a concrete or earthen basin and may be associated with a prior art pumping or gravity discharged system (not shown) which is controlled by and cooperates with the cyclic controls of the wastewater treatment system (not shown). 28 is a cap which caps off the pipe stem 20 which may be removed which allows the upper end of pipe stem 20 to receive an effluent discharge pipe if desired by engineering choice. It is to be understood that the pipe stem 20 may be designed and is intended to be versatile enough to allow the discharge effluent pipe to be attached at either end or anywhere of engineering choice along it's length.

30 is a manifold which substantially takes the shape of a four-sided doughnut which supports decanting valves 32 as more clearly defined in applicant's application Ser. No. 07/753,860, now U.S. Pat. No. 5,234,580, with 34 being flexible pipes suitably attached to decanting valves 32 and straight pipe sections 36, sections 36 also being suitably attached to shorter flexible pipes 38 which in turn are suitably connected to pipe stem 20 with 40 being a screen, shown in FIG. 3, which may be used by engineering choice.

In the preferred embodiment of FIG. 1, the manifold 30 is made buoyant by floating member 42 which may take the form of a cellular foam log and shown by ghost lines in FIG. 1, and by section in FIG. 2, FIG. 2 being drawn to a larger scale.

44 depicts the water level of a typical basin (not shown) and it will be seen that the buoyant manifold 30 floats and moves up and down vertically and is captured by upright pipe stem 20 to keep the manifold 30 at the water level 44, while flexible pipes 34 and 38 along with straight pipe sections 36 allows a "knee" action to take place at 46 and the design keeps the apparatus from becoming entangled, In FIG. 5, substantially the same embodiment of FIG. 1 is taught but including a different floatation system, namely, 48 being an inflatable and deflatable bladder (shown in a first inflated position) which is suitably attached to manifold 30 such as by chains 50 with 52 being an air hose for inflating and deflating bladder 48 upon demand from the wastewater treatment system (not shown). Also, a screen 54 is shown in FIG. 6 which is a large opening screen to keep valve balls 53, shown in FIGS. 6 and 7, of valves 32 from entering the manifold 30 during the decant phase.

FIG. 7 shows the embodiment of FIG. 5 in a deflated second position which allows the apparatus to sink below the water level 44 during the air off and settling phases.

In FIGS. 8 and 9 we show yet another embodiment which teaches the decanting valves 32 being mounted on an elongated, substantially rectangular manifold 56 which includes internal floatation means such as floating logs 58 shown in ghost lines with 60 being the manifold effluent discharge pipe. The manifold 56 is captured by pipe stems 62 which allow manifold 58 to float at the water level 44.

Figure 10:
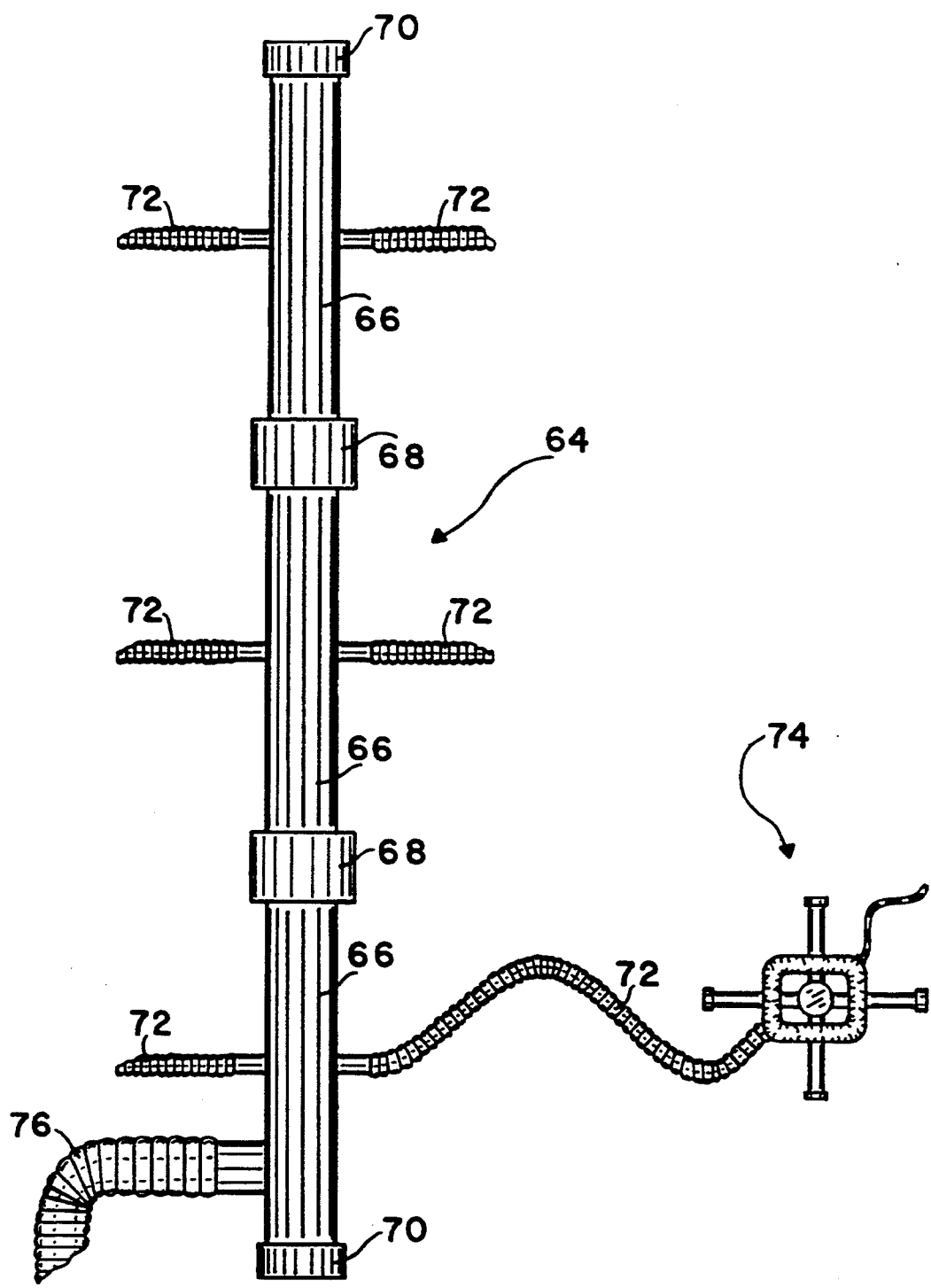
FIG. 10, is a top plan view of a manifold discharge system associated with multiple decanters.

In FIG. 10, 64 is a manifold pipe assembly designed to lay on the bottom of a basin (not shown) and may be made from pipe sections 66, couplings 68 and end caps 70, while 72 are typical flexible hoses which attaches decanter assembly 74 to the manifold pipe assembly 64, with 76 being the effluent discharge pipe associated with a wastewater treatment system (not shown).

It will now be seen that we have provided a floating decanter system which may be adapted to a wastewater treatment system which may serve a basin of any size as the decanting apparatus may be used in unison or singularly as required.

In the second embodiment the decanting apparatus sinks below the liquid surface of the basin during the air/off and settling phases, thus keeping the surface 44 clear of debris which can accumulate odors and unsightly sludge.

It will also be seen that decanting occurs below the surface 44 from the settled clear zone of effluent.

It will also be noted that each decanting assembly may be installed or removed (such as for maintenance) independently of each other.

It will also be noted that no modifications of an existing basin (concrete or earthen) is necessary as the air hoses and manifold effluent discharge pipes may be draped over the walls of the basin (not shown).

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and desire to secure by letters patent is:

1. A decanter apparatus comprising; at least one elongated hollow up-rising first member, support means to support said at least one first member in substantially a vertical position, said support means including at least three horizontal legs, said legs containing weights, a manifold, said manifold being substantially in the shape of a hollow doughnut body with a cavity forming substantially a doughnut hole, said manifold surrounding but spaced from said first member, said doughnut hole being larger in circumference than the outer circumference of said at least one first member, an inlet valve means adjacent to said manifold, buoyant means within or coupled to said manifold, at least one flexible hollow second member, said at least one first member, an inlet valve means adjacent to said manifold, buoyant means within or coupled to said manifold, at least one flexible hollow second member, said at least one second member connecting the interior of said body of said manifold to the interior of said at least one first member, at least one hollow third member, said at least one third member connecting the interior of said at least one first member to an effluent discharge system, whereby, said at least one first member, said support means, said manifold, said valve means, said buoyant means, said at least one second member and said at least one third member cooperate together to form a floating decanting apparatus.

2. The decanting apparatus of claim 1 in which said weights are poured concrete and end caps are included for said legs.

3. The decanting apparatus of claim 1 including at leas tone elongated substantially tubular screen, said screen being of a size and shape to fit inside said at least one first member.

4. The decanting apparatus of claim 1 including a top end cap for each said at least one first member.

5. The decanting apparatus of claim 1 in which said buoyant means is a cellular log.

6. The decanting apparatus of claim 1 in which said buoyant means is a bladder, said bladder coupled to means to inflate and deflate said bladder, said bladder having attaching means to attach said bladder to said manifold.

7. The decanting apparatus of claim 6 in which said means to attach said bladder to said manifold is by chains.

8. The decanting apparatus of claim 6 in which said means to inflate and deflate said bladder is an air hose.

9. The decanting apparatus of claim 1 in which said valve means includes a screen.

10. A decanting apparatus comprising; at least two elongated up-rising first members, support means to support said at least two first members in substantially a vertical position, a manifold, said manifold being substantially in the form of a hollow rectangular body having an interior cavity, said rectangular body being of a length and width to surround while being spaced from said at least two first members, multiple inlet valve means adjacent to said manifold, buoyant means within or coupled to said manifold and at least one flexible hollow second member, said at least one second member connecting the interior of said body to an effluent discharge system, whereby, said at least two first members, said support means, said manifold, said multiple inlet valve means, said buoyant means and said at least one second member cooperate together to form a floating decanter.

11. The decanting apparatus of claim 10 in which said buoyant means is a cellular log.

* * * * *